(12) United States Patent
Grogg et al.

(10) Patent No.: US 9,695,884 B2
(45) Date of Patent: Jul. 4, 2017

(54) DUAL PISTON DISCONNECT ACTUATOR FOR POWER TRANSFER UNIT

(71) Applicant: Eaton Corporation, Cleveland, OH (US)

(72) Inventors: John Allen Grogg, LaOtta, IN (US); Daniel Philip Fisher, Coldwater, MI (US); Scott Michael Besemer, Battle Creek, MI (US); Gregory L. Heatwole, Marshall, MI (US)

(73) Assignee: Eaton Corporation, Cleveland, OH (US)

( * ) Notice: Subject to any disclaimer, the term of this patent is extended or adjusted under 35 U.S.C. 154(b) by 136 days.

(21) Appl. No.: 14/408,098

(22) PCT Filed: Mar. 15, 2013

(86) PCT No.: PCT/US2013/031987
§ 371 (c)(1),
(2) Date: Dec. 15, 2014

(87) PCT Pub. No.: WO2014/021945
PCT Pub. Date: Feb. 6, 2014

(65) Prior Publication Data
US 2015/0167750 A1    Jun. 18, 2015

Related U.S. Application Data

(60) Provisional application No. 61/678,825, filed on Aug. 2, 2012.

(51) Int. Cl.
*F16D 25/08* (2006.01)
*F16D 25/062* (2006.01)
(Continued)

(52) U.S. Cl.
CPC .......... *F16D 25/083* (2013.01); *F16D 23/06* (2013.01); *F16D 25/0632* (2013.01);
(Continued)

(58) Field of Classification Search
None
See application file for complete search history.

(56) References Cited

U.S. PATENT DOCUMENTS

| | | |
|---|---|---|
| 2,518,825 A | 8/1950 | Simpson |
| 2,543,252 A | 2/1951 | Nabstedt et al. |

(Continued)

FOREIGN PATENT DOCUMENTS

| | | |
|---|---|---|
| AT | 375881 B | 9/1984 |
| EP | 1510380 A2 | 3/2005 |

(Continued)

*Primary Examiner* — Ramya Burgess
*Assistant Examiner* — Timothy M Hannon
(74) *Attorney, Agent, or Firm* — Mei & Mark LLP

(57) ABSTRACT

A piston system comprises a housing (3) comprising a first recess (6) and a second recess (7). A first piston (1) comprises a first portion embedded in the first recess (6). A second piston (2) comprises a second portion embedded in the second recess (7). An actuator (10) has a first side (20) and a second side (21). The first piston (1) selectively presses against the first side (20) of the actuator, and the second piston (2) selectively presses against the second side (21) of the actuator. The actuator may be a synchronizer of a clutch assembly.

20 Claims, 8 Drawing Sheets

(51) Int. Cl.
  *F16D 23/06*     (2006.01)
  *F16H 63/30*     (2006.01)
  *F16D 25/0632*   (2006.01)

(52) U.S. Cl.
  CPC . *F16H 63/3023* (2013.01); *F16D 2023/0693* (2013.01); *F16D 2300/08* (2013.01); *F16H 2063/303* (2013.01)

(56) References Cited

U.S. PATENT DOCUMENTS

| | | |
|---|---|---|
| 5,935,041 A | 8/1999 | Tsukamoto et al. |
| 7,478,718 B2 | 1/2009 | De Mazière |
| 2002/0062714 A1 | 5/2002 | Albert et al. |
| 2003/0188949 A1 | 10/2003 | Porter |
| 2006/0011008 A1 | 1/2006 | Hara et al. |
| 2007/0028709 A1 | 2/2007 | Futamura et al. |
| 2011/0132712 A1* | 6/2011 | Noehl .............. F16D 13/70 192/48.601 |
| 2011/0256976 A1 | 10/2011 | Burgbacher et al. |
| 2011/0308875 A1 | 12/2011 | Marsh et al. |

FOREIGN PATENT DOCUMENTS

| | | |
|---|---|---|
| EP | 1617109 A1 | 1/2006 |
| EP | 1750037 A2 | 2/2007 |
| EP | 1617109 B1 | 3/2008 |
| FR | 2928431 A1 | 9/2009 |
| WO | 2009048409 A1 | 4/2009 |

\* cited by examiner

DUAL PISTON DISCONNECT ACTUATOR FOR POWER TRANSFER UNIT

PRIORITY

This application claims the benefit of priority of, and is a §371 National Stage entry of, PCT/US2013/031987 filed Mar. 15, 2013, and further claims the benefit of priority of U.S. provisional patent application 61/678,825 filed Aug. 2, 2012, incorporated herein by reference it their entireties.

TECHNICAL FIELD

The present disclosure relates generally to piston systems. More specifically, the disclosure relates to a system comprising two opposed pistons for actuating a clutch.

BACKGROUND

Current automotive drivelines may comprise all-wheel-drive ("AWD") systems where all wheels on the driveline are actively engaged to propel the vehicle. Some AWD systems have a primary drive axle that receives engine power for propelling the vehicle. An auxiliary drive axle can receive a portion of the engine power from the primary drive axle for active engagement of all wheels in the driveline. Other systems may divide power between the primary and auxiliary axles.

Some AWD vehicles comprise a disconnect to convert the vehicle from AWD to front-wheel-drive ("FWD") or rear-wheel-drive ("RWD"). The FWD or RWD system propels the vehicle through the one active front or rear axle. The remaining axle is pulled or pushed by the primary drive axle until AWD mode is engaged.

Disconnect devices have comprised a clutch and a single piston, and in some implementations, a shift fork. The clutch can engage to distribute engine power to the drive axles, and the clutch can release to prevent power transfer to one of the drive axles. The single piston may push against the clutch to engage the clutch and the shift fork can release piston pressure to disengage the clutch. The prior art disconnects have had various interfaces with the housing to activate the piston such as openings and pass-throughs in the housing to accommodate the shift fork. Thus, the prior art devices are prone to leak, are subject to strain at interface locations, and are generally bulky. In addition, the shift fork is prone to breaking.

SUMMARY

The dual piston disconnect disclosed herein provides a lighter weight, compact, energy efficient, cost efficient, and durable disconnect.

A piston system may comprise a housing comprising a first recess and a second recess. A first piston comprises a first portion embedded in the first recess. A second piston comprises a second portion embedded in the second recess. An actuator has a first side and a second side. The first piston selectively presses against the first side of the actuator, and the second piston selectively presses against the second side of the actuator.

The piston system may form a part of a synchronizer assembly comprising a synchronizer collar and a cone clutch. The first piston is configured to selectively disengage the synchronizer collar from the cone clutch and the second piston is configured to selectively engage the synchronizer collar with the cone clutch.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate the teachings of the disclosure.

DETAILED DESCRIPTION

Reference will now be made in detail to the examples illustrated in the accompanying drawings. Wherever possible, the same reference numbers will be used throughout the drawings to refer to the same or like parts. Directional references, such as left and right, are for ease of reference to the figures and are not meant to be limiting.

Figure 1:
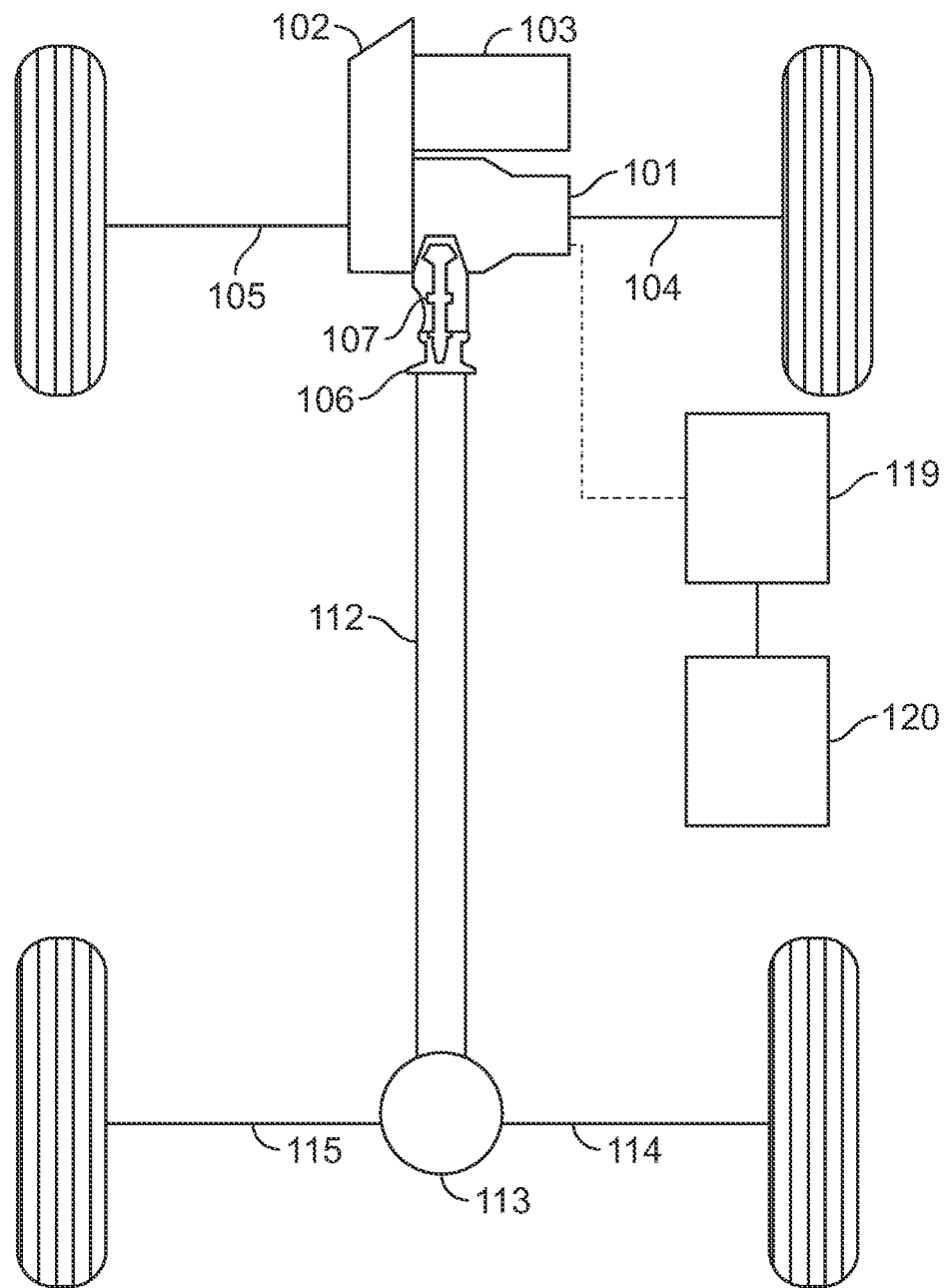
FIG. 1 is an example of an AWD driveline that converts to FWD.

FIG. 1 is a schematic example of a driveline that can convert between AWD and FWD. Many customary elements are omitted. An engine 103 supplies torque power to a transmission 102. A power transfer unit 101 is connected to the front drive axle to supply torque to left and right front outer output half shafts 105 and 104. The power transfer unit 101 also controls the distribution of torque to the rear axle by selectively interfacing with a pinion gear 107 connected via coupling 106 to drive shaft 112. A rear differential 113 receives the torque from the drive shaft 112, and the torque is distributed to left and right rear axles 115 and 114.

At least one hydraulic system 119 is connected to the power transfer unit 101 to supply actuation forces. The hydraulic system 119 is connected to an electronic control system 120 for timing and torque quantity control. The electronic control system 120 may be connected to sensors distributed on the driveline, such as a sensor to detect pinion 107 rotation speed, or sensors for wheel speed, rear differential 113 speed, front axle speed, engine speed, transmission gear selected, etc. In some circumstances, the sensors may be connected to a steering column, gas pedal or clutch pedal to collect additional data. Based on the information collected by the sensors, a processor in the electronic control system 120 can execute programming stored in a memory device and the electronic control system 120 can instruct the hydraulic system 119 to supply fluid actuation forces.

Figure 2:
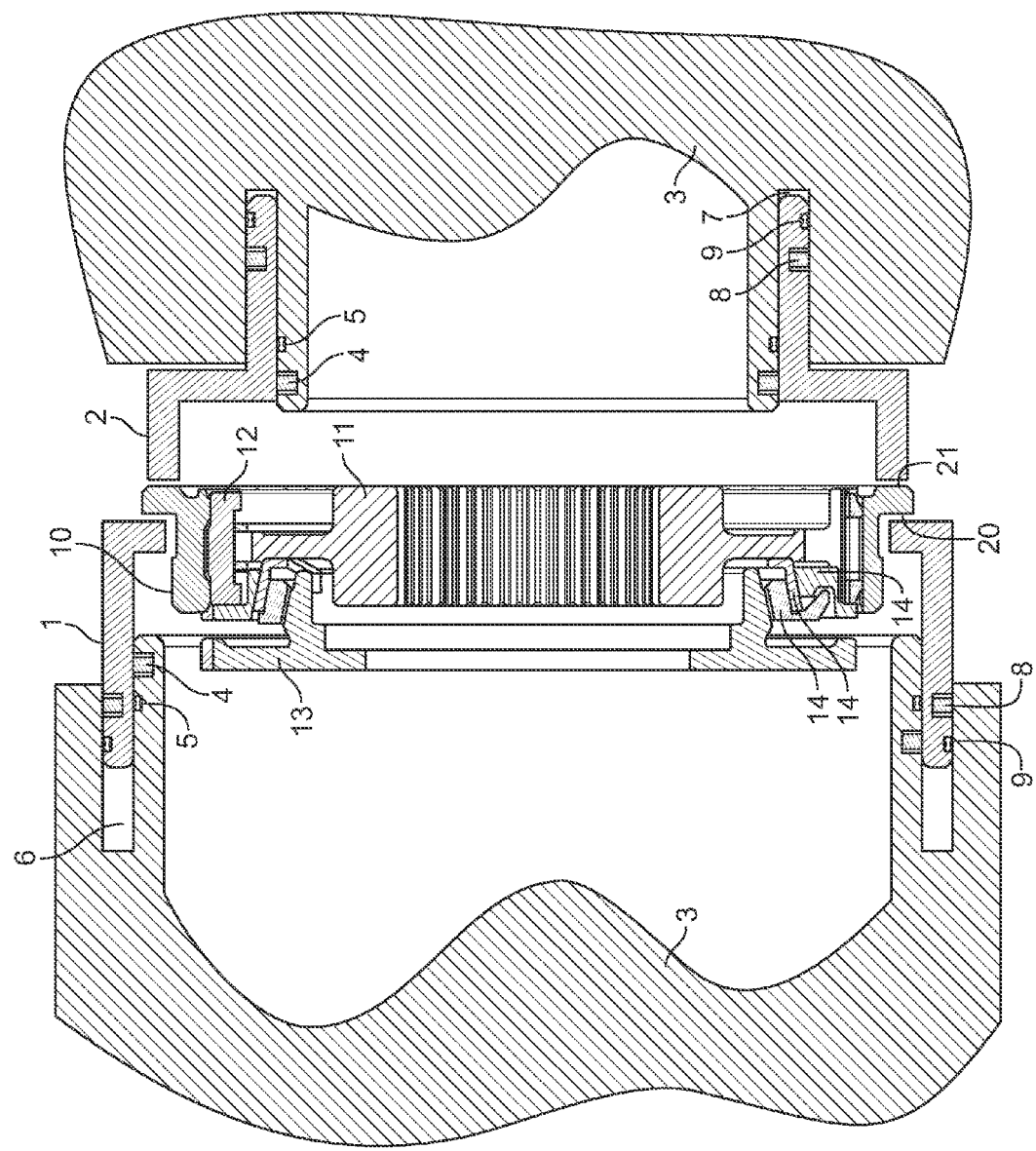
FIG. 2 is an example of a dual piston system.

FIG. 2 shows an exemplary implementation of a dual piston system. A first piston 1 moves opposite to a second piston 2. Each piston 1, 2 is embedded in a housing 3, which housing can be an integral piece, or separate, mating pieces. In one implementation, the housing 3 is two pieces which mate along a plane between opposed pistons 1 and 2. The housing 3 has a recess 6, 7 for each piston 1, 2. The recesses 6 and 7 include connections to a hydraulic system. To prevent hydraulic fluid leakage, the housing 3 may have two additional recesses for housing o-rings 4 and 5. The o-rings may be quad ring seals, or PTFE (polytetrafluoroethylene) wiper seals having the capacity to wipe debris off of the bore of the recesses 6 and 7. In addition, each piston 1, 2 may include two recesses each for housing o-rings 8 and 9. These o-rings may also be quad ring seals or PTFE wiper seals. Alternatively, o-rings 4 and 8 may be wear rings, and o-rings 5 and 9 may be quad ring seals. The size, number, and spacing of recesses and o-rings on the housing 3 or pistons 1 and 2 can vary.

In the example of FIG. 2, the opposed pistons 1 and 2 move to direct an actuator, in this example, a dog-style synchronizer collar 10. That is, the first piston 1 is a disengagement piston that slides the synchronizer collar 10 to the right. The second piston 2 is an engagement piston that presses against the synchronizer collar 10 to slide it to the left. In this arrangement, as the first piston 1 moves to the right, the second piston 2 moves to the left. When the second piston 2 moves to the right, the first piston 1 moves to the left, and the synchronizer collar 10 moves with the pistons 1 and 2. The motion of the synchronizer collar 10 controls the engagement of an affiliated cone clutch 14, which may be part of a "synchromesh." While FIG. 2 shows one example of a synchromesh style clutch, the dual piston arrangement can be implemented with other clutch systems having a slideable actuation disc.

FIG. 2 shows one example of an actuator being driven by two pistons. The cross-section is to a power transfer unit having a cone clutch and synchronizer mechanism as a torque transfer mechanism. The actuator may be a synchronizer collar 10 that slides over and links with a synchronizer input hub 11 having interspersed synchronizer struts 12. The synchronizer input hub is connected via splines to the front drive axle, which receives rotative power from the transmission. The front drive axle may rotate while torque power is transferred to the front drive axle.

The rotation force of the front drive axle is selectively coupled to the cones 14 of the cone clutch and to the synchronizer output spline collar 13. That is, as the engagement piston 2 pushes against the synchronizer collar 10 and pushes it leftward, the synchronizer collar 10 slides over an outermost one of the cones 14. The outermost one of the cones 14 can rotate and begin the rotation of the remaining cones 14. That is, the cones 14 press together and friction forces cause the cones to rotate with the synchronizer output spline collar 13. The cone 14 rotation brings the synchronizer output spline collar 13 up to the same speed as the synchronizer collar 10. The matched speed allows a blocking ring (baulk ring) or synchronizing strut 12 on the synchronizer input hub 11 to adjust. The synchronizer collar 10 may then slide onto the synchronizer output spline collar 13 to allow torque transfer from the synchronizer input hub 11.

The torque of the front axle can be smoothly transferred through the gradual pressing of the engagement piston. This allows for a smooth torque transfer from primary drive axle to auxiliary drive axle.

To release the torque transfer, the first disengagement piston 1 is selectively moved to the right to slide the synchronizer collar away from the synchronizer output spline collar 13. The cones 14 can then separate to discontinue torque transfer. In this example, no springs are needed for separation because the clutch compliance is adequate to enable separation. The omission of springs reduces friction losses and drag, and thereby increases fuel economy.

Several benefits inure through the above arrangement. First, if power is lost, the synchronizer can remain in its current position, avoiding premature or sudden disengagement of torque transfer, and corresponding sudden halting of a traveling vehicle. Also, the system lacks the shift fork of the prior art, which further decreases losses due to drag, since the fork is not present to cause churn in the coupling fluid.

In lieu of the above disadvantages, the dual pistons 1 and 2 do not rotate and do not add the drag losses of the prior art spring or fork arrangements. In addition, the concentric, in-line pistons allow for a step-like configuration. This allows the housing 3 to get smaller along the direction from its center-vehicle position to its outer edge. This reduces the footprint and weight of the power transfer unit 101 and makes it easier to install in the tight spaces near the engine, transmission, etc. Because the pistons 1 and 2 are embedded in the housing 3, instead of free-standing in the housing 3, additional braces and couplings are unnecessary, further reducing drag losses and the weight of the power transfer unit 101. The reduced weight and reduced drag losses increase the fuel efficiency of the vehicle. The reduced drag also contributes to more complete idling of the auxiliary drive system. That is, the parts connected to the auxiliary drive system are less likely to rotate or otherwise move or engage because the driveline can idle from the cones 14 and or synchronizer output spline collar 13 through to the auxiliary drive axle. In the example of FIG. 2, this means that if AWD was disconnected and FWD is engaged, the front drive axle would receive all torque power and the rear axles 115 and 114 would be pulled along. The pinion gear 107 and drive shaft 112 would idle, as would the hypoid gear of the power transfer unit 101.

Prior implementations, such as in copending U.S. application Ser. No. 12/944,714 for Idle-Able Auxiliary Drive System, used both a cone clutch and a wet clutch pack. The instant dual piston design may be used in such a two clutch system, or, as shown herein, the dual piston system can surround the cone clutch and eliminate the wet clutch, making the cone clutch the sole torque transfer mechanism. The elimination of the wet clutch further reduces weight and drag losses. The smooth, controlled engagement of the pistons 1 and 2 allows for smooth, controlled torque coupling and the dog-style ensures complete, strong engagement.

As shown in FIG. 2, the synchronizer collar 10 may comprise a lip that protrudes outwardly away from the centerline of rotation. The lip provides surfaces for the pistons 1 and 2 to press against. That is, the disengagement piston 1 pushes against a first side 20 of the lip, and the engagement piston 2 pushes against the second side 21 of the lip. Each side 20, 21 of the lip has a surface area, and each piston 1, 2 has a surface 22, 23 with a respective contact area. The contact areas of the pistons 1 and 2 that contact the respective sides of the lips 20 and 21 are significantly smaller than the surface areas of the sides of the lips 20 and 21. In addition, as seen with piston 1, the surface 22 may be larger than the contact area. In addition, the piston surface area in the contact area may be half or less than half of the surface areas of the sides 20, 21 of the lip. The difference between the piston contact 22, 23 areas and the lip side 20, 21 surface areas avoids excessive force that can break the synchronizer collar 10.

Figure 3:
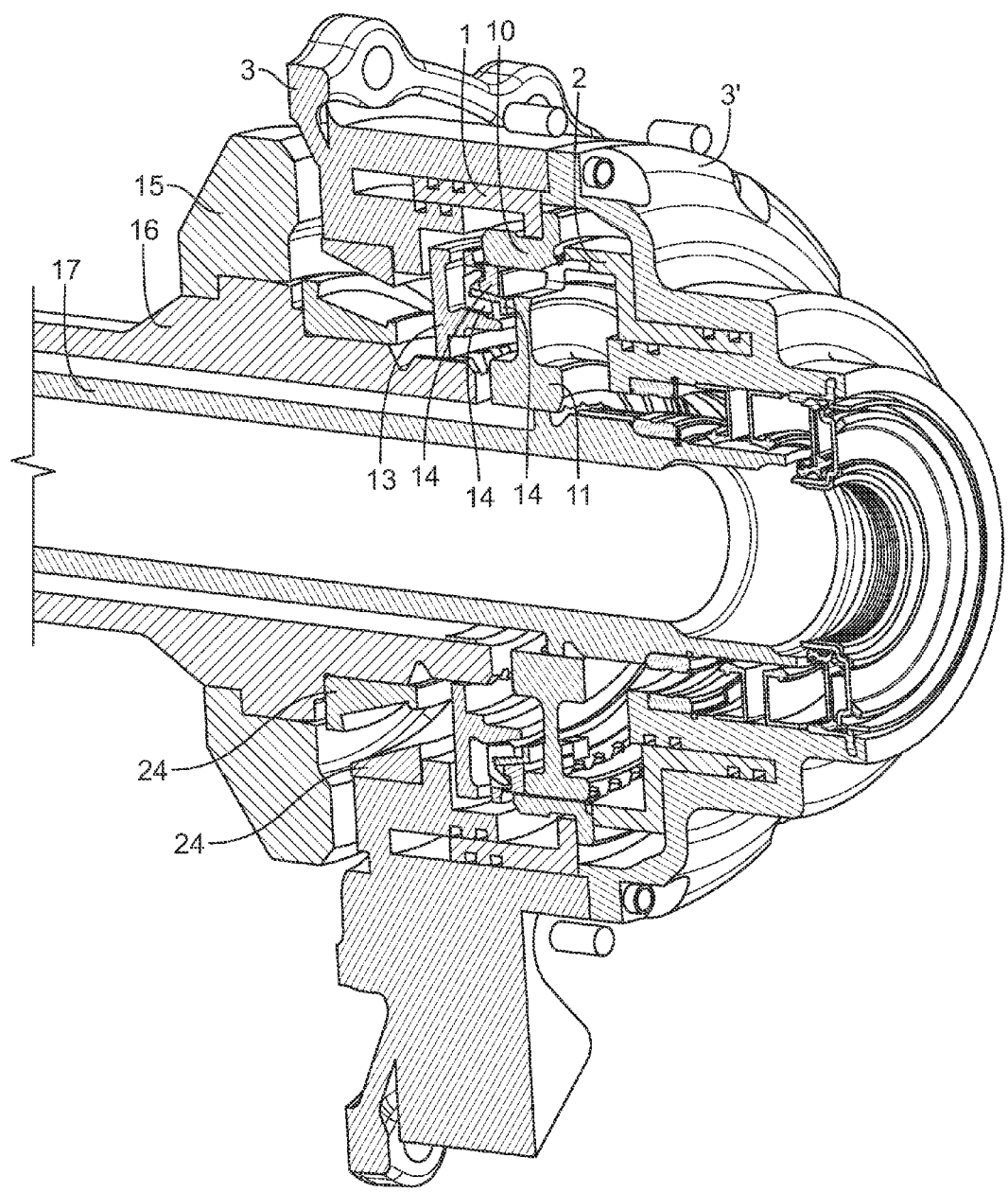
FIG. 3 is an example of a dual piston system in a power transfer unit.

Turning to FIG. 3, the power transfer unit 101 is shown in an alternate view. The housing comprises two pieces 3 and 3'. A third housing piece may enclose portions of the front drive axle, flange half spool 16, and hypoid gear 15. The portion of the front drive axle within the power transfer unit may be an inner output half shaft 17.

Figure 4:
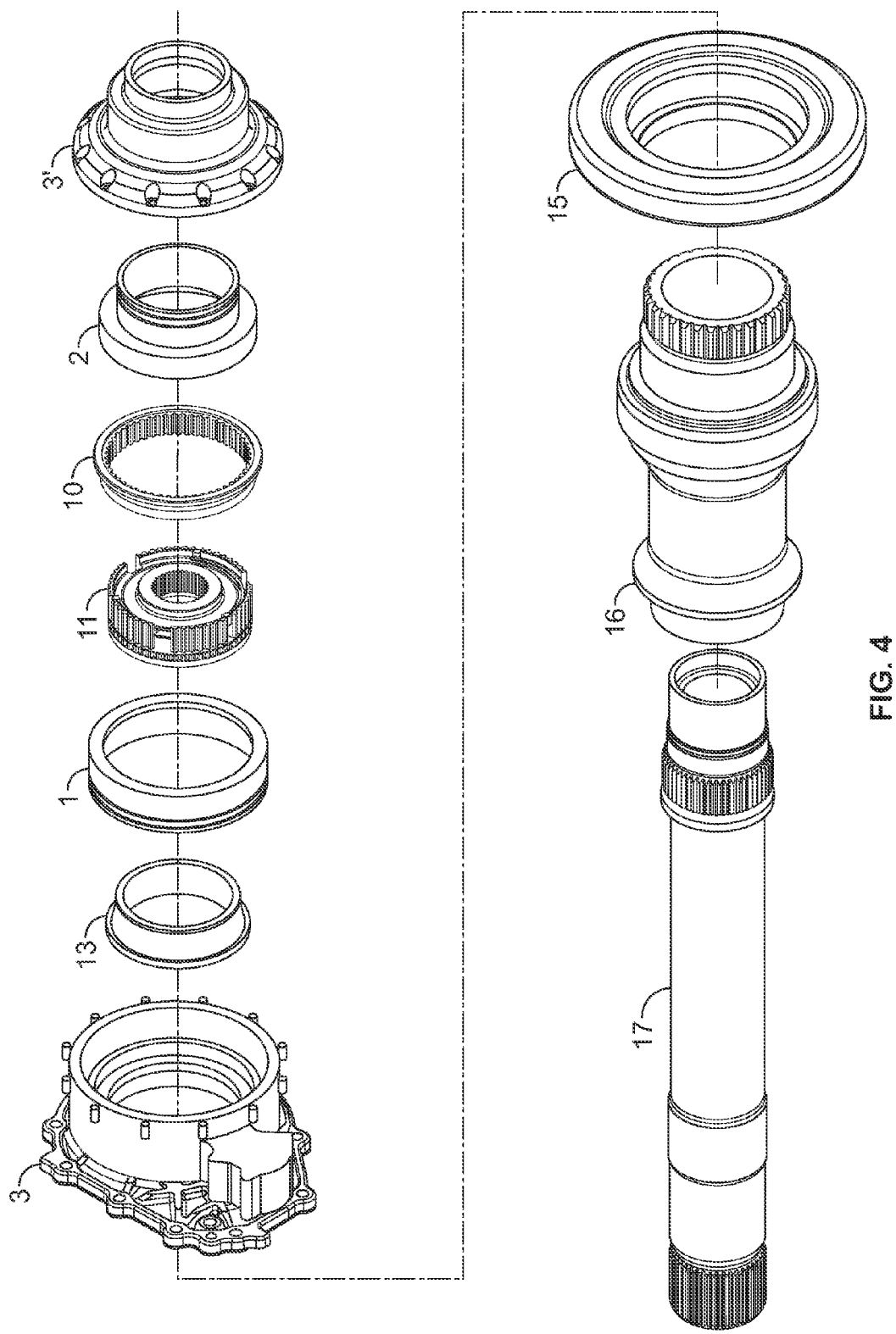
FIG. 4 is an exploded view of the primary parts of FIG. 3.

FIG. 4 shows an exploded view of the parts of FIG. 3. A roller bearing 24 interposes the flange half spool 16 and the housing piece 3. Other bearings, seals and connections are shown in breakaway between the output half shaft 17 and the housing piece 3'. Housing piece 3 may be bolted to transmission 102, or it may be bolted to another housing piece surrounding hypoid gear 15.

Figure 5A:
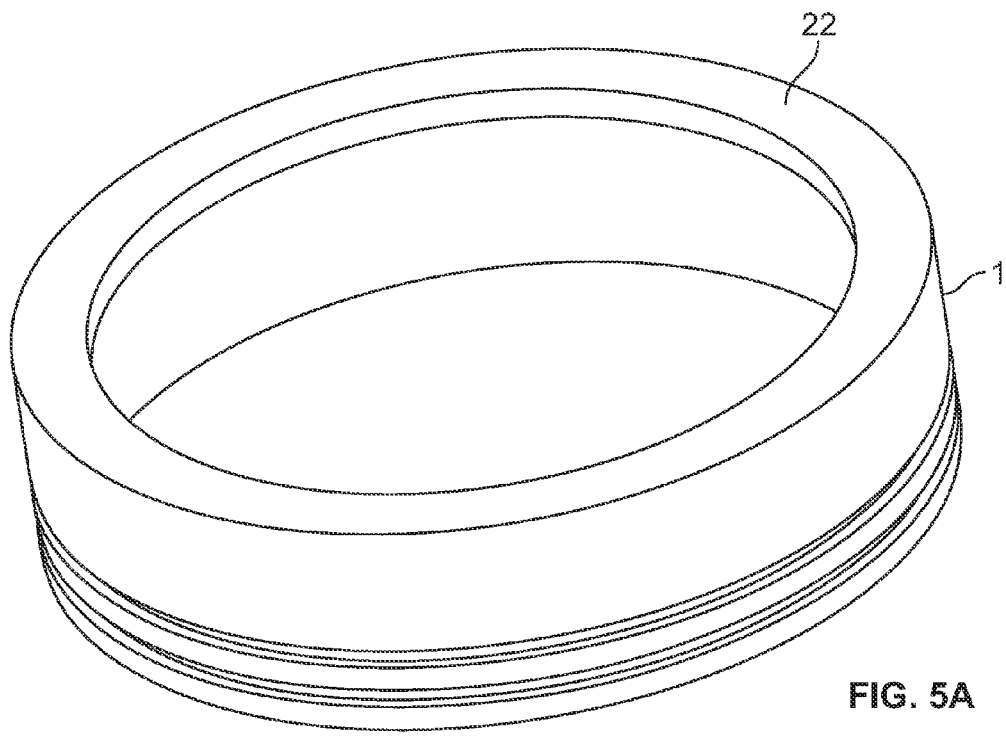
FIG. 5A is a perspective view of a first side of the first piston.
Figure 5B:
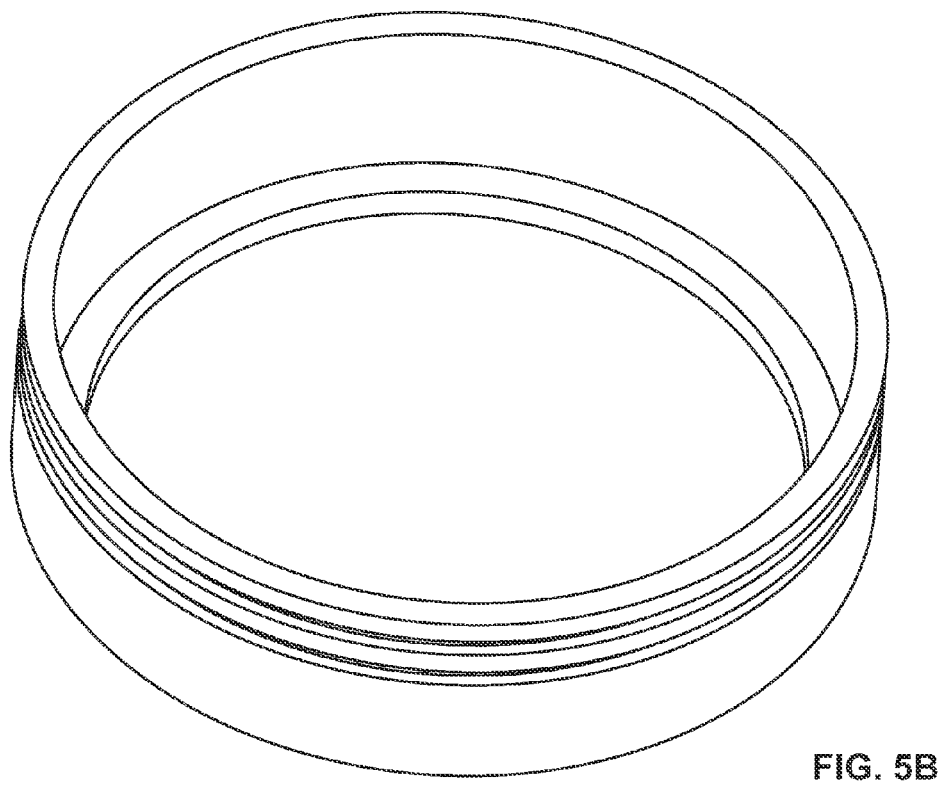
FIG. 5B is a perspective view of the second side of the first piston.

FIG. 5A is a perspective view of a first side of the first piston 1, and FIG. 5B is a perspective view of the second side of the first piston 1. The contact area and the surface 22 are also shown in FIG. 5A.

Figure 6A:
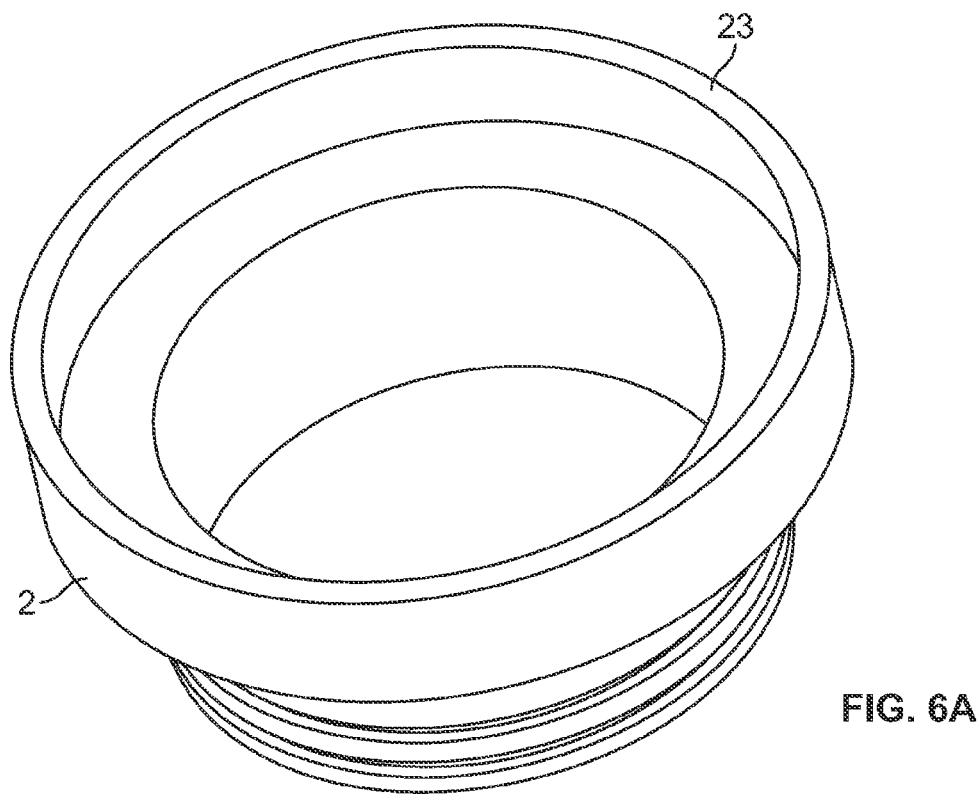
FIG. 6A is a perspective view of a first side the second piston.
Figure 6B:
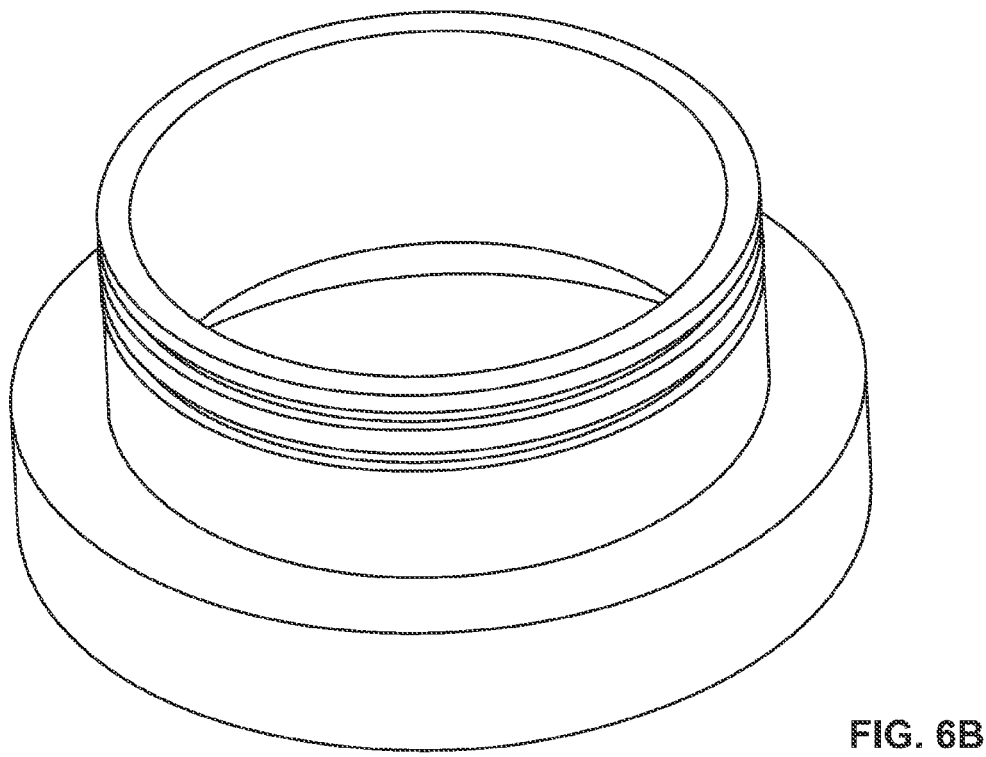
FIG. 6B is a perspective view of the second side of the second piston.

FIG. 6A is a perspective view of a first side the second piston 2, and FIG. 6B is a perspective view of the second side of the second piston 2. The contact area and the surface 23 are also shown in FIG. 6A.

Figure 7:
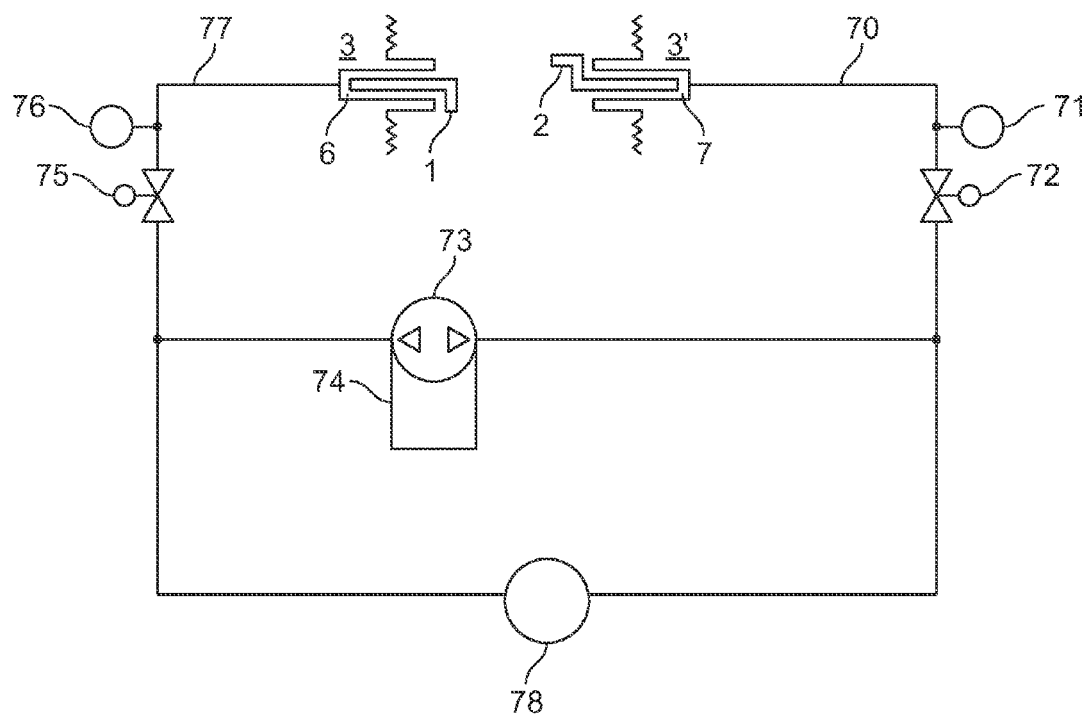
FIG. 7 is a schematic of a hydraulic control system for the pistons.

FIG. 7 is a schematic of a hydraulic control system for the pistons 1 and 2. A hydraulic fluid supply line 70 connects to the recess 7 of the housing 3'. A pressure sensor 71 senses if too much pressure is supplied to the recess 7 and if so, excess pressure is released via release valve 72. The supply line 70 connects to a vacuum pump 73, which is run by motor 74. The vacuum pump 73 connects to a supply line 77 that is also connected to a pressure release valve 75 and sensor 76. The supply line connects to recess 6. With this arrangement, as fluid is supplied to recess 6, it is pulled from recess 7 and vice versa to keep the pistons 1 and 2 moving oppositely in synchrony. To account for hydraulic fluid losses over the system life or pressure release functions, an accumulator 78, or sump, connects to each supply line 70, 77.

The pressure sensors 71 and 76 and pressure release valves 72 and 75 may connect to the electronic control system 120 for data collection and regulation, respectively. In the alternative, the pressure release valves 72 and 75 may be preset to release pressure over a certain amount. It may also be necessary to include additional pressure sensors and pressure release points as well as additional control electronics.

The dual piston system may interface with an electronic control system 120 or hydraulic control system 119 such as disclosed in co-pending U.S. application Ser. No. 12/944,714, incorporated herein by reference in its entirety. At a minimum, the electronic control system 120 may comprise a processor, memory, and control program stored in the memory in an on-board chip or vehicle computer system. The vehicle sensors mentioned above may have electrical connectivity and inputs and outputs to the electrical control system 102. The electronic control system 120 may have electrical input and output connectivity to the hydraulic control system 119.

Figure 8:
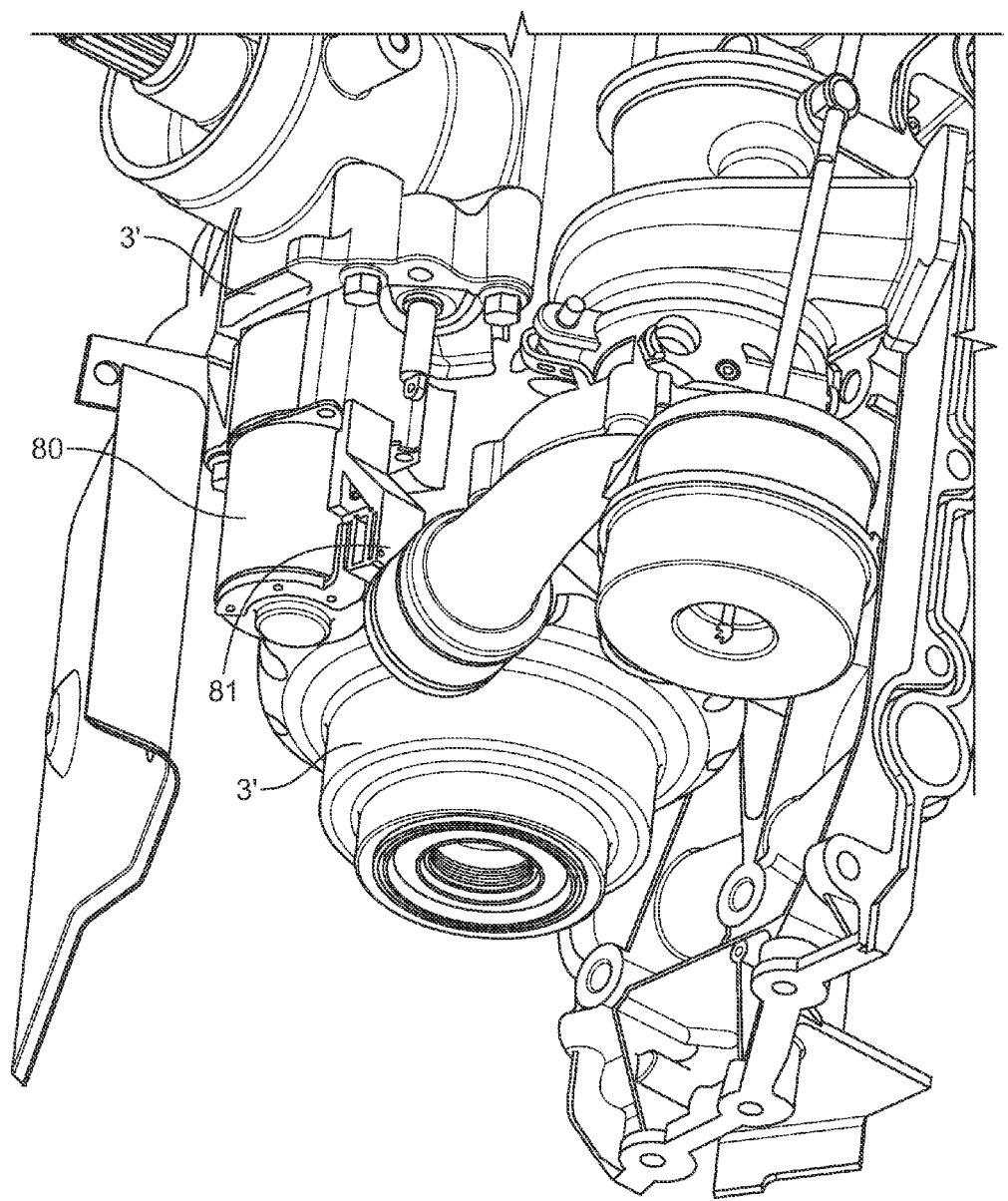
FIG. 8 is an example of an electrical and hydraulic connection to a housing.

As shown in FIG. 8, at least one hydraulic connection for controlling the dual pistons 1 and 2 may be mounted to housing piece 3' in the form of a hydraulic actuator 80 and associated electronics connection 81. The hydraulic actuator 80 may house the entirety of FIG. 7 spanning between recesses 6 and 7, or the hydraulic actuator may comprise input and output connections to a larger or separate hydraulic system within hydraulic control system 119.

In the preceding specification, various teachings have been described with reference to the accompanying drawings. It will, however, be evident that various other modifications and changes may be made thereto, and additional configurations may be implemented, without departing from the broader scope of the claims that follow. The specification and drawings are accordingly to be regarded in an illustrative rather than restrictive sense.

For example, the dual piston has been illustrated in a front wheel drive (FWD) system, but it is equally implementable in a rear drive unit of a rear wheel drive (RWD) vehicle. Likewise, the dual piston design may be implemented in a transfer case for disconnecting the driveline. In addition, the dual piston disconnect has applicability in hybrid electric vehicles.

Other embodiments will be apparent to those skilled in the art from consideration of the specification and practice of the teachings disclosed herein. It is intended that the specification and examples be considered as exemplary only, with the true scope and spirit of the invention being indicated by the following claims.

We claim:

1. A piston system, comprising:
a housing comprising a first recess and a second recess;
a non-rotating first piston comprising a first portion embedded in the first recess and a first cylindrical surface protruding from the first recess;
a non-rotating second piston comprising a second portion embedded in the second recess and a second cylindrical surface protruding from the second recess; and
a rotatable actuator separating the first cylindrical surface from the second cylindrical surface, the actuator comprising a first side and a second side,
wherein the first cylindrical surface selectively presses against the first side of the actuator, and
wherein the second cylindrical surface selectively presses against the second side of the actuator.

2. The system of claim 1, wherein the first piston is opposite to the second piston, and the first side of the actuator faces the first piston and the second side of the actuator faces the second piston.

3. The system of claim 1, wherein the actuator comprises a lip, and the first cylindrical surface and the second cylindrical surface alternately press on the lip.

4. The system of claim 1, wherein the first piston and the second piston are concentric.

5. The system of claim 1, wherein the first piston has an outer diameter that is larger than an outer diameter of the second piston.

6. The system of claim 1, wherein the first side of the actuator has a first surface area and the first cylindrical surface of the first piston that selectively presses against the first side of the actuator has a surface area smaller than half the surface area of the first surface area.

7. The system of claim 6, wherein the second side of the actuator has a second surface area and the second cylindrical surface of the second piston that selectively presses against the second side of the actuator has a surface area smaller than half the surface area of the second surface area.

8. The system of claim 1, wherein the actuator is a synchronizer collar for a clutch.

9. The system of claim 1, wherein the housing fully encloses the first piston, the second piston, and the actuator.

10. The system of claim 1, wherein the first piston and the second piston are selectively movable, when the first piston moves towards the rotatable actuator, the second piston moves away from the rotatable actuator, and when the first piston moves away from the rotatable actuator, the second piston moves towards the rotatable actuator.

11. The system of claim 1, further comprising a hydraulic system in fluid communication with the first recess, the first piston, the second recess, and the second piston.

12. The system of claim 1, wherein the first piston further comprises a first ring seal in a recess in the first embedded portion and the second piston further comprises a second ring seal in a recess in the second embedded portion.

13. The system of claim 12, wherein the first piston cooperates with the housing, the first ring seal, and at least one other ring seal to form a first quad seal arrangement, and wherein the second piston cooperates with the housing, the second ring seal and at least one other ring seal to form a second quad seal arrangement.

14. The system of claim 1, wherein the housing further comprises:
at least a third recess adjacent the first piston, the third recess configured to receive a seal; and
at least a fourth recess adjacent the second piston, the fourth recess configured to receive a seal.

15. The system of claim 1, wherein the first piston further comprises a recess in the first embedded portion, and the second piston further comprises a recess in the second embedded portion.

16. The system of claim 1, wherein the second portion is circumferentially stepped inward from the second cylindrical surface.

17. A clutch unit comprising:
a housing comprising a first recess and a second recess;
a first piston comprising a first portion embedded in the first recess;
a second piston comprising a second portion embedded in the second recess; and
a synchronizer assembly comprising a synchronizer collar and a cone clutch,
wherein the first piston is configured to selectively disengage the synchronizer collar from the cone clutch and the second piston is configured to selectively engage the synchronizer collar with the cone clutch, and
wherein the first piston and the second piston are concentric and an outer diameter of the first piston is greater than an outer diameter of the second piston.

18. The clutch unit of claim 17, wherein the housing fully encloses the first piston, the second piston, and the synchronizer assembly.

19. The clutch unit of claim 17, further comprising a hydraulic system in fluid communication with the first piston and the second piston for moving the first piston and the second piston, wherein, when the first piston moves towards the synchronizer collar, the second piston moves away from the synchronizer collar.

20. A piston system, comprising:
a housing comprising a first ring-shaped recess in a first wall of the housing and a second ring-shaped recess in a second wall of the housing;
a first piston comprising a first ring-shaped portion embedded in the first ring-shaped recess and a first cylindrical portion protruding from the first ring-shaped recess;
a second piston comprising a second ring-shaped portion embedded in the second ring-shaped recess and a second cylindrical portion protruding from the second ring-shaped recess;
a hydraulic system in fluid communication with the first ring-shaped recess, the first ring-shaped portion, the second ring-shaped recess, and the second ring-shaped portion; and
an actuator between the first cylindrical portion and the second cylindrical portion,
wherein the hydraulic system is configured to selectively move the first piston towards and away from the actuator such that, when the first piston moves towards the actuator, the first piston moves the actuator and the second piston moves away from the actuator, and such that, when the first piston moves away from the actuator, the second piston moves towards the actuator and the second piston moves the actuator.

* * * * *